(No Model.)
S. C. C. CURRIE.
METHOD OF AND APPARATUS FOR MEASURING ELECTRIC CURRENTS.
No. 442,423. Patented Dec. 9, 1890.
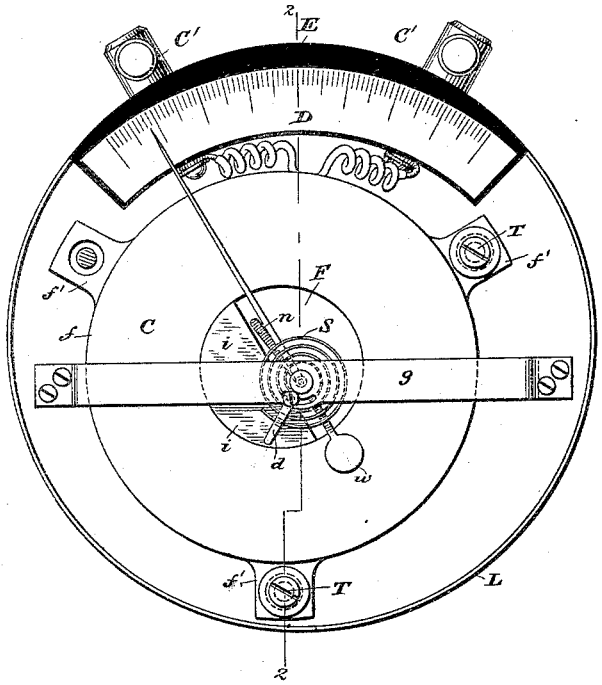
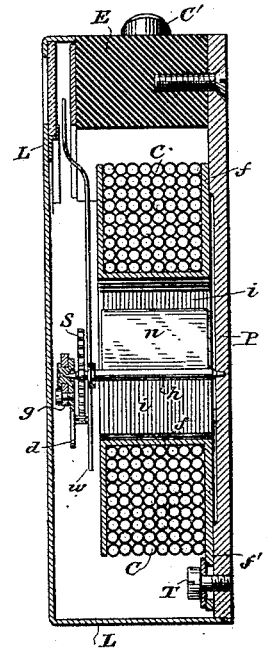
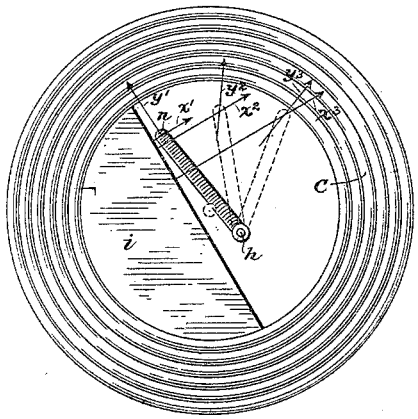
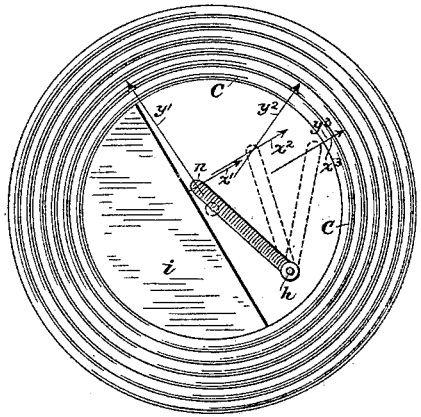
Witnesses
Geo. W. Breck
C. E. Ashley
Inventor
Stanley C. C. Currie
By his Attorneys
Baldwin, Davidson & Wight

UNITED STATES PATENT OFFICE.

STANLEY CHARLES CUTHBERT CURRIE, OF PHILADELPHIA, PENNSYLVANIA, ASSIGNOR, BY MESNE ASSIGNMENTS, TO THE UNITED GAS IMPROVEMENT COMPANY, OF SAME PLACE.

METHOD OF AND APPARATUS FOR MEASURING ELECTRIC CURRENTS.

SPECIFICATION forming part of Letters Patent No. 442,423, dated December 9, 1890.

Application filed December 26, 1889. Serial No. 334,921. (No model.) Patented in England April 20, 1886, No. 5,479.

*To all whom it may concern:*

Be it known that I, STANLEY CHARLES CUTHBERT CURRIE, a subject of the Queen of Great Britain, residing at Philadelphia, in the county of Philadelphia and State of Pennsylvania, have invented certain new and useful Improvements in the Method of and Instruments for Measuring Electric Currents, of which the following is a specification.

Letters Patent of the Kingdom of Great Britain, No. 5,479, dated April 20, 1886, have been granted to me upon this invention.

In this instrument the pointer is dead-beat and gives direct readings of the current measured—that is to say, the deflection of the pointer is proportional to the current passing through the instrument. Thus in an ampere-meter the movement of the pointer is proportional to the number of amperes of current up to any amount within the capacity of the instrument. I supplement the action of a magnet upon the indicating-pointer by the action of a coil in which current is passing in such manner that variations in the influence of the magnet due to variations of distance between an armature and the magnet-core are compensated by the action of the current in the coil.

The improved method of operation consists in actuating the indicator device by a resultant force due to two forces—one acting to repel and the other to attract—the ratios of the two forces being so related that as one diminishes the diminution is compensated by an increase in the other, whereby a direct reading is obtained.

In the accompanying drawings, Figure 1 is a plan of an instrument with the cover removed; Fig. 2, a section therethrough on the line 2 2 of Fig. 1; and Figs. 3 and 4 are larger diagrammatic views indicating the action of the iron core and coil upon the iron or armature which actuates the indicating needle or pointer.

A coil of insulated wire C, whose terminals are connected with the binding-posts C' C', mounted in a block of insulating material E on the bed-plate, is wound upon a spool $f$, preferably of brass or other diamagnetic material. Within the cylinder F is a piece of soft iron $i$, the length of which is preferably the same as the depth of the coil measured in the direction of its axis, and the cross-section of which is a segment of a circle. Either almost a half-circle is shown or a greater or less segment, according to requirements. The soft-iron core $i$ is secured within the spool $f$. Within the space between the face of the soft-iron core $i$ and the opposite interior face of the spool is fixed a piece of soft iron $n$, preferably of a length equal to that of the core $i$, and of a suitable width—such, for instance, as shown. This plate of soft iron is carried by a spindle $h$, which may be made in one piece with the iron plate $n$, or may be made of brass and attached thereto. Instead of the plate of soft iron $n$, such as shown, a much narrower piece of iron might be used. The spindle might be of brass, and the iron $n$ and the spindle be connected by arms projecting from the spindle, and made either of iron or of brass or of other diamagnetic material. The spindle $h$ is pointed at top and bottom, and one end is seated in a socket in the bed-plate P and the other end in a like socket in a cross-piece $g$, mounted upon the bed-plate and bridging the coil. A needle or pointer is attached to the end of the spindle and moves over a scale D. The opposite end of the needle may be provided with a counter-weight $w$ to balance it so that the instrument can be used in any position. A spring S, like the balance-spring of a watch, has one end fastened to the spindle and its outer end to an adjustable piece $d$, carried by the bridge $g$. This spring tends to keep the movable piece of soft iron $n$ pressed against the face of the iron core $i$, and by means of the adjustable part $d$ this pressure may be varied. Any force tending to separate the pieces of soft iron would be exerted against the spring.

The base of the spool $f$ is provided with projections $f''$, having enlarged or slot openings through which screws T pass to secure the spool to the bed-plate. The purpose of this arrangement is to adjust the spool and iron core $i$ with reference to the spindle or center $h$, upon which the iron piece $n$ moves, as presently described. Of course any suitable mechanism for providing an adjustment in this regard may be adopted. The instrument may have a cover L, of any suitable material, which if not transparent should have a glass panel through which the scale D may be read.

When a current of electricity traverses the coil C, the fixed soft-iron core $i$ and the movable soft-iron piece $n$ are similarly polarized and a repulsive force, varying according to the strength of the current, is exerted between the two; but, as is perfectly-well known, this repulsive force will vary with the strength of the current and the juxtaposition of the two pieces of iron $i$ $n$. In this arrangement, however, the iron piece $n$ is acted upon directly by the coil C by a force of attraction and as the distance between the iron piece $n$ and the core $i$ increases the distance between the iron piece $n$ and the coil decreases, and the diminishing repulsive action between the two pieces of iron is compensated by the increasing attractive force between the coil and piece of iron $n$. By adjusting or previously determining the exact position of the axis or spindle $h$ with reference to the iron core $i$ and the center of the coil C these two forces may be so regulated that the movement of the iron piece $n$, and consequently of the indicator-pointer, will be exactly proportional to the current passing in the coil.

Referring to Fig. 3, $h$ may represent the center of motion of the movable iron piece, and $n$ the outer end thereof. The lines $x'$ $x^2$ $x^3$ may represent the direction of the repulsive force exerted between the core and the iron piece $n$, while $y$ $y^2$ $y^3$ may represent the lines of attraction between the coil C and the iron piece $n$ for the three positions indicated in the diagram. Fig. 4 is a similar view showing a different position of the center of motion $h$. In each of these figures it will be perceived that as the distance between the iron piece $n$ and the core $i$ increases the distance between the coil C and the iron piece $n$ decreases. It will now be clear that by varying the position of the center $h$ the relation of the two ratios, the one increasing and the other decreasing, can be varied and a point can be found at which the ratio of decrease is compensated by the ratio of increase, and then for every increment of current in the coil there is a corresponding and proportional increment of resultant force tending to move the iron piece $n$. If the resistance of the spring S were absolutely uniform, this point would be the point to adjust to; but since no spring is absolutely uniform the adjustment should be such that the resultant force tending to move the iron piece $n$ will be a slightly-increasing one to compensate for the increasing strain of the spring.

In every instrument the proper adjustment may be made according to the constant requirements of the particular instrument.

Of course the invention herein described may be embodied in other forms than that shown; but the instrument illustrated is one that I have found to be a practical and efficient one.

I claim as my invention—

1. The herein-described method of measuring electrical currents by the resultant of two forces created thereby, which method consists in acting upon a movable armature repulsively by one of said forces and attractively by the other, and so proportioning the ratios of repulsion and attraction that as the armature moves from the point of repulsion toward the point of attraction the diminishing repulsive effect thereupon is compensated by an increasing attractive effect, whereby direct readings may be obtained.

2. The combination, substantially as set forth, of a coil in which a current to be measured passes, a core magnetized thereby, and a polarized armature movable from the core toward the coil, said armature being acted upon repulsively by the core and attractively by the coil, whereby as the armature moves away from the core and the repulsive effect of the core thereupon diminishes the attractive effect of the coil increases.

3. The combination, substantially as set forth, of the coil in which the current to be measured passes, the soft-iron core, the soft-iron armature rocking upon a center non-coincident with the center of the coil and polarized by the coil, said armature being repelled by the iron core and attracted by the coil, as described.

4. The combination, substantially as set forth, of the coil, its core, a soft-iron piece or armature, the core and armature being similarly polarized by the current passing in the coil, an axis parallel but not in line with the axis of the coil about which the armature moves, means for adjusting the relation of these two axes to each other, and an indicator actuated by the movement of the armature.

5. The combination, substantially as set forth, of the coil, the core, the iron armature or piece $n$, arranged within the coil parallel to the core and movable about an axis, as described, an indicating device actuated by the armature, and means for adjusting the axes of the armature and coil with reference to each other.

6. The combination, substantially as set forth, of the coil, the core, the armature $n$, its axis non-coincident with the axis of the coil, the spring S, and indicating device.

7. The combination, substantially as set forth, of the coil, its core, the counterbalanced armature, and means for adjusting the relation of the axes of the coil and armature.

8. The combination, substantially as set forth, of the coil, its core partly filling the opening in the coil, an armature $n$, also arranged within said opening and rocking about an axis parallel with the axis of the coil, but non-coincident therewith, the spring, the counterbalance-weight, and the indicator actuated by the armature.

In testimony whereof I have hereunto subscribed my name.

STANLEY CHARLES CUTHBERT CURRIE.

Witnesses:
W. G. GRIFFITH,
CHAS. E. MACHOLD.